United States Patent [19]

Krieger et al.

[11] Patent Number: 4,643,297
[45] Date of Patent: Feb. 17, 1987

[54] PLATFORM CONVEYOR

[75] Inventors: Eberhard Krieger, Weinstadt; Theo Moser, Steinenberg, both of Fed. Rep. of Germany

[73] Assignee: Robert Bosch GmbH, Stuttgart, Fed. Rep. of Germany

[21] Appl. No.: 695,110

[22] Filed: Jan. 25, 1985

[30] Foreign Application Priority Data

Apr. 13, 1984 [DE] Fed. Rep. of Germany ....... 3413910

[51] Int. Cl.⁴ ............................................. B65G 17/06
[52] U.S. Cl. .................................. 198/803.01; 198/853
[58] Field of Search ..................... 198/851, 853, 803.01

[56] References Cited

U.S. PATENT DOCUMENTS

| | | | |
|---|---|---|---|
| 1,800,663 | 4/1931 | Schade | 198/853 |
| 3,231,069 | 1/1966 | Lanham | 198/853 |
| 3,799,328 | 3/1974 | Harvey | 198/853 |
| 4,050,323 | 9/1977 | I'Anson | 198/853 |
| 4,469,221 | 9/1984 | Albert | 198/853 X |

FOREIGN PATENT DOCUMENTS 1281350 10/1968 Fed. Rep. of Germany ...... 198/853

Primary Examiner—Joseph E. Valenza
Assistant Examiner—Jonathan D. Holmes
Attorney, Agent, or Firm—Edwin E. Greigg

[57] ABSTRACT

A platform conveyor having an articulated chain and bearing elements secured thereon. In order to secure the retention of the bearing elements, which lock into place with claws on the linking bolts of the articulated chain, adjacent claws locking into place on the same linking bolt mesh form-fittingly with one another. To this end, the claws alternate in having protrusions and recesses.

2 Claims, 2 Drawing Figures

PLATFORM CONVEYOR

BACKGROUND OF THE INVENTION

The invention is based on a platform conveyor. In a known platform conveyor of this type, the claws of the bearing elements, which are embodied in the form of a slit eye, have a bottom adapted to the diameter of the linking bolts of the articulated chain, and an opening the width of which is slightly smaller than the diameter of the linking bolts. Because of this form of embodiment, the bearing elements, which are made of plastic, can be mounted on the articulated chain by being placed onto the linking bolts; during this process the somewhat yielding claws initially widen somewhat and the bolts thereupon lock into place in the bottom of the claws, so that the claws forming the most part encompass and grip the linking bolts in a form-fitting manner. To prevent the bearing elements from flying off the chain when traveling through a diversion section as a result of the attendant centrifugal force, the directions in which the claws of one bearing element open are at angles relative to one another. Despite this, in the known platform conveyor it does happen that a resistance suddenly intruding into the conveyor path will tear one or even a whole series of the inserted bearing elements from the chain.

OBJECT AND SUMMARY OF THE INVENTION

The platform conveyor according to the invention has the advantage over the prior art that without expending additional material, the retention of the bearing elements on the chain can be improved substantially by securing adjacent bearing elements with respect to one another. The reliability of the retention of the bearing elements is still further increased in that the opening directions of two claws of adjacent bearing elements, which claws surround and engage the same bolt, are offset at an angle from one another, so that one linking bolt is encompassed and gripped about a virtually closed circular ring by two adjacent claws cooperating with one another in a form-fitting manner.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
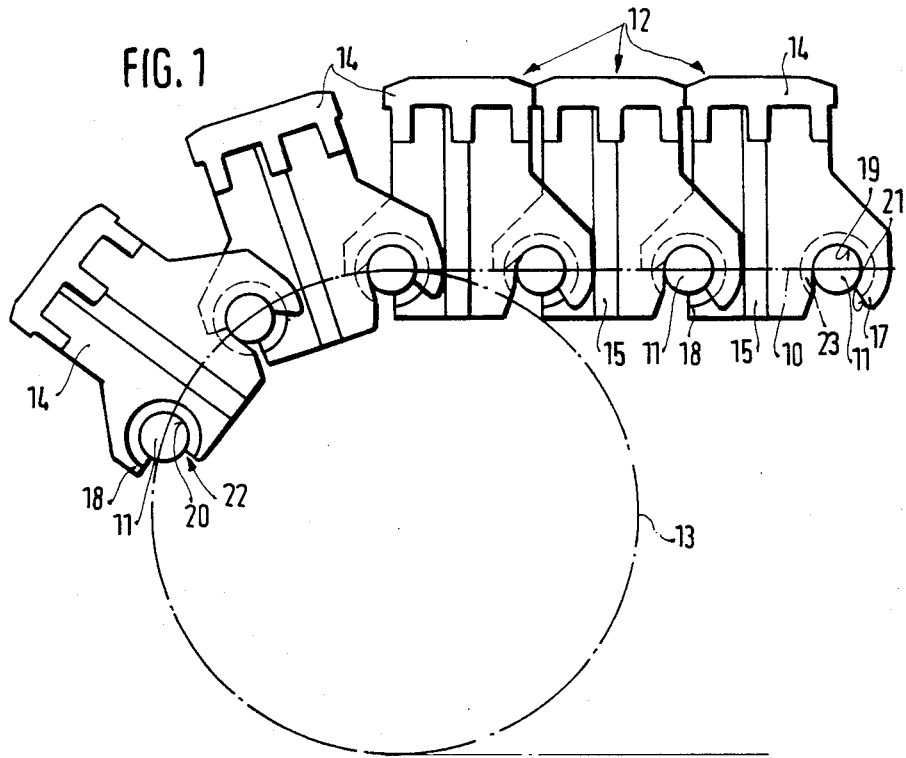
FIG. 1 shows a portion of a platform conveyor according to the invention in a side view.
Figure 2:
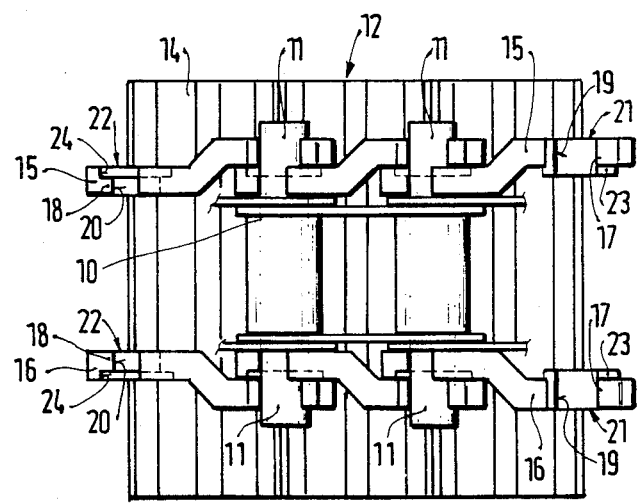
FIG. 2 shows a portion of one flight of the platform conveyor according to FIG. 1, seen from below.

The platform conveyor has an endless articulated chain 10 having laterally offstanding linking bolts 11 and bearing elements 12 secured to them. The chain 10, which is shown in simplified form as a dot-dash line in FIG. 1, is guided and driven via chain wheels 13, one of which is shown, again in dot-dash lines in simplified form.

The bearing elements 12 each have a platform 14, which extends horizontally in the conveying plane, and two feet 15, 16 extending in the conveyor direction and offstanding downward from the platform 14. The front area of the feet 15, 16 as seen in the conveyor direction is laterally offset in a mirror reversal from the area to the rear by the thickness of one of the feet, so that the pairs of feet of adjacent bearing elements 12 disposed one behind the other are capable of partially meshing with one another. To secure the bearing elements to the chain 10, the feet 15, 16 each have one front and one rear claw 17, 18. The distance between the two claws 17, 18 of one foot 15, 16 is equal to the distance between two linking bolts 11 of the articulated chain 10. The claws 17, 18 border on a bore 19, 20, the diameter of which is equal to that of the linking bolts 11, and a slit-like opening 21, 22. The opening 21 of the front claws 17 as seen from within the conveyor is transverse to the plane of a platform 14 and downward while the opening 22 of the rear claws 18 is directed downward and obliquely backward at an angle of approximately 45° with respect to the plane of the platforms 14. The width of the openings 21, 22 of the claws 17, 18 is somewhat smaller than the diameter of the linking bolts 11, so that the linking bolts lock form-fittingly into place but rotatably in the bores 19, 20.

In order to hold the bearing elements 12 securely on the linking bolts 11 of the chain 10 even when there are abrupt impacts and resistances, the feet 15, 16 in the vicinity of their claws 17, 18 are joined to one another form-fittingly but also articulatedly. To this end, a protrusion 23 in the form of a ring, which is interrupted by the opening 21, is disposed on the front claws 17 on the side facing the rear claws 18. The annular protrusion 23 is coaxial with the bore 19 of the claws 17. Complementary to the protrusions 23 of the claws 17, the rear claws 18 have an annular recess 24 on their outer side, facing the front claws 17, which recess is engaged in a form-fitting manner by the protrusion 23 of the particular claw 17 resting there. By means of this axial, articulated connection between the front claw 17 of a trailing bearing element 12 and the rear claws 18 of a leading bearing element 12, good retention of the bearing elements 12 on the linking bolts 11 of the chain 10 is assured. The security of this retention is still further increased in that the opening direction of the openings 21, 22 of the front and rear claws, respectively, is offset at an angle, so that as a result of the combined angle encompassed by which two cooperating claws 17 and 18 the form-fitting connection extends virtually over the entire circumference of the linking bolts 11—in the exemplary embodiment, over an angle of 315°. The combined form-fitting connection over the entire circumference can be attained if the opening direction of the openings 21 and 22 of two adjacent claws 17, 18 is offset by 90° and more.

The articulated chain 10 is equipped with bearing elements 12 in the following manner:

One bearing element 12 each is placed with its rear claws 18, as viewed in the conveyor direction, on a linking bolt 11 in a position inclined obliquely backward and then by pressing on the bearing platform 14 the claws 18 are pushed onto the linking bolts 11, so that the linking bolts lock into place in the bores 20. When it is pushed onto the linking bolt 11, the opening 22 of the claw 18 opens up somewhat because of the elasticity of the material from which the bearing element 12 is made. Subsequently the bearing element 12 is pivoted forward in the conveyor direction, so that the front claws 17 rest on the leading linking bolt 11. Under the influence of pressure on the bearing platform 14, the front claws 17 then also snap into place on the leading linking bolts 11 in the same way, the various bearing elements 12 that follow after in the conveyor direction are secured on the chain 10 in succession. In order to assure the introduction of the protrusions 23 into the recesses 24 of the claws 17, 18, the protrusions 23 are beveled somewhat at the point where, when the bearing elements 12 pivot in order to be placed on the linking bolts, they first come into contact with the feet 15, 16 in the vicinity of the rear claws 18, so that it is possible to introduce the feet, as the adjacent claws 17, 18 are elastically deflected, and pushed into place.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A platform conveyor comprised of a stock articulated chain having laterally offstanding links, interconnected bolt means and bearing elements adapted to be mounted upon said bolt means outboard of said links, said bearing elements including an upstanding platform and a pair of retaining feet in laterally opposed relation, each of said retaining feet having front and rear claws including substantially circular means defining openings having a diameter arranged to grasp said bolt means, said means defining openings in said rear claw being canted rearwardly and downwardly, said front claws being offset laterally with respect to said rear claws for complemental lateral engagement therebetween, each said front claw having an inwardly-directed protrusion and each said rear claw having a complementally formed recess, each said protrusion and each said recess being oriented about said means defining openings and the protrusion of a respective front claw of one bearing element arranged to simultaneously engage said bolt means of said endless chain and the recess of a respective rear claw of the adjacent bearing element, whereupon said rear claw is initially snapped over one of said bolt means and thereafter rotated downwardly to engage said front claw with another bolt means.

2. A platform conveyor as defined by claim 1, in which said protrusions and said recesses are formed as annular arc segments disposed laterally on said claws, so that the protrusions and the recesses of respective adjacent bearing elements are adapted to be received within one another.

* * * * *